G. Rieseck,
Rotary Steam Valve.
No. 655.
Reissued Feb. 8, 1859.
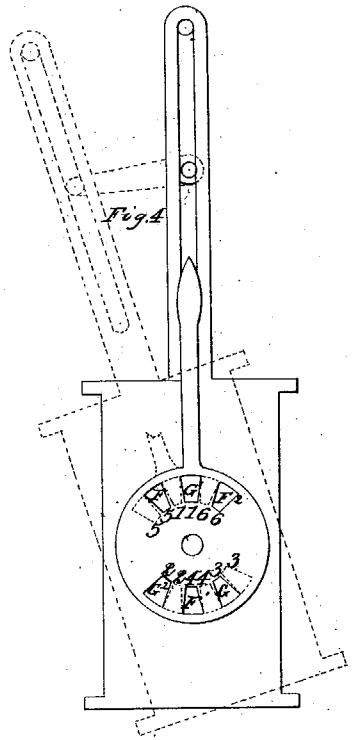
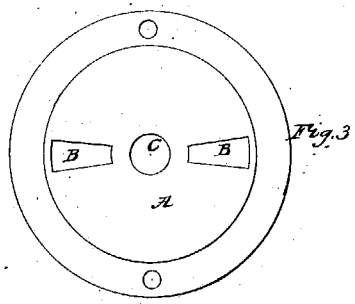
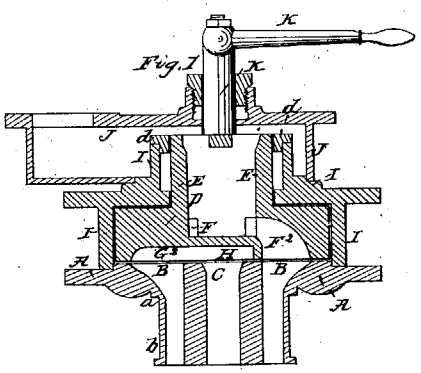
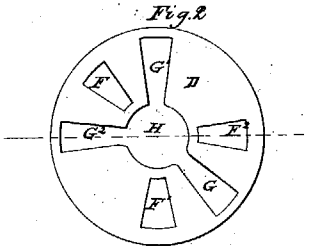
N. PETERS, PHOTO-LITHOGRAPHER, WASHINGTON, D. C.

UNITED STATES PATENT OFFICE.

GEORGE RIESECK, OF PITTSBURG, PENNSYLVANIA.

IMPROVED STEAM-VALVE.

Specification forming part of Letters Patent No. 21,157, dated August 10, 1858; Reissue No. 655, dated February 8, 1859.

*To all whom it may concern:*

Be it known that I, GEORGE RIESECK, of Pittsburg, in the county of Allegheny and State of Pennsylvania, have invented a new and useful Improvement in Steam-Valves; and I do hereby declare that the following is a full, clear, and exact description of the same, reference being had to the accompanying drawings, forming a part of this specification, in which—

Figure 1 is a vertical longitudinal section of a steam-valve constructed after my invention. Fig. 2 is a face view of the valve. Fig. 3 is a face view of the valve-seat. Fig. 4 is a diagram illustrating my invention.

Similar letters of reference in each of the several figures indicate corresponding parts.

The nature of my invention consists, first, in the arrangement, hereinafter specified, whereby that portion of the back of the valve which is exposed to the pressure of the live steam can be reduced to an area equal, or nearly so, to the area of the steam-receiving ports in its face without the necessity of reducing the diameter of the valve, and thus the valve is balanced, or nearly balanced, and held in proper position by the steam, owing to the direct pressure of the live steam upon the back of the valve not being greater than the pressure of the live steam in the receiving-ports of the valve.

It consists, second, in combination with the above peculiar construction of the valve, in making the face of the valve with six ports, three for receiving and three for exhausting, said ports being arranged in such relation to each other that one receiving-port always stands in line with an exhaust-port, and that only four of the ports shall be in use when the engine is working, and the extra two remain in reserve, so that by shifting the valve the engine may be instantly and completely reversed under the full pressure of steam from a full open port.

To enable others skilled in the art to make and use my invention, I will proceed to describe its construction and operation.

A represents the valve-seat. It is of ordinary construction, and may be arranged on a stationary or oscillating engine. When arranged on an oscillating engine, it is furnished with a trunnion from *a* to *b*; but when applied to a stationary engine the trunnion is not necessary.

B B are the two receiving-ports in the valve-seat, and C the central exhaust-port.

D is the valve. It is of circular form, and has a reduced hollow stem, E, projecting from its back.

F $F'$ $F^2$ are three receiving-ports, and G $G'$ $G^2$ three exhaust-ports, in the valve D.

H is an enlarged central space for the ports G $G'$ $G^2$ to exhaust in. This space communicates with the central discharge or main escape exhaust-passage. The receiving-ports F $F'$ and G $G'$ receive and exhaust steam as usual when the engine is working in one direction, and when the valve is shifted or turned on its axis, in order to reverse the engine, the ports $F^2$ $G^2$ are brought into action, while the ports $F'$ $G'$ are thrown out of use. The ports F $F'$ $F^2$ extend up through the valve obliquely, and communicate with the interior of the hollow extended supply-stem, as shown in Fig. 1, while the exhaust ports or chambers only extend slightly into the face of the valve, and terminate radially in a central space, H, in the face of the valve, said space communicating with the exit or main central exhaust-passage, which has communication with the hollow trunnion on the opposite side of the engine cylinder. The valve thus constructed is arranged upon the seat, and the outer surface of its stem, that portion of its back between the stem and the circumference of the valve and the entire edge, are covered by an auxiliary steam chest or casing, I, which is furnished with a stuffing box at *d*, and serves effectually for protecting said surfaces of the valve from being acted upon by the live steam. The valve thus incased has a main steam-chest, J, constructed upon it, the top of said chest being high enough to allow a space to exist between it and the outer end of the stem of the valve for the passage of the steam through the stem to the ports of the valve. By thus covering the greater portion of the back of the valve and having the outer end of the stem and the stuffing-box and only a portion of the back of the valve which is equal to the bore of the stem exposed to the steam, the valve will be balanced, or nearly balanced, between the direct inward pressure of the live steam in the chest and the outward pressure of the live steam in the receiving-ports F F′ F², as the area of said ports is about equal to the area of the surface presented by the stuffing-box, stem, and exposed part of the back of the valve. This arrangement also avoids the necessity of using a set-screw to keep the valve in proper position, as the steam will perform the same functions of a set-screw at the end of the stem without the disadvantage—as when a set-screw is used—of having the valve bind or leak by reason of the unequal contraction or expansion of the metal forming the steam chest and valve.

K is the lever for reversing the valve.

The accomplishment of the perfect balancing of the valve in the manner herein specified, in connection with an instantaneous and perfect reversing of the engine while working under a full pressure of steam without the necessity of shutting off the steam between the engine and the boiler, is a very important desideratum in the art of engine-building, and has long occupied the minds of the most skillful engine-builders.

Having thus described the nature, construction, and operation of my improvement, what I claim as my invention, and desire to secure by Letters Patent of the United States, is—

1. The valve D, with a projecting hollow stem, E, which is reduced so that its end presents an area only equal, or nearly so, to the receiving-ports in the face of the valve, in combination with a main steam-chest or chamber, J, and an auxiliary steam chest or casing, I, furnished with a stuffing-box, *d*, and constructed so as to cover the whole of the back of the valve, excepting the end of the stem or a portion of the back, equal, or nearly equal, to the receiving-ports in its face, substantially as and for the purposes set forth.

2. In combination with the above, the peculiar manner herein specified of making the face of the valve D with six ports, F F′ F² and G G′ G², three for receiving and three for exhausting, said ports being arranged in such relation to each other that when the valve is applied to an oscillating engine one receiving-port always stands in line with an exhaust-port, and that only four of the ports shall be in use when the engine is working, the other two being kept in reserve, so that by shifting the valve the engine will be instantaneously reversed under a full pressure of steam without shutting off the steam between the engine and the boiler, as herein described and set forth.

GEORGE RIESECK.

Witnesses:
C. MOORE,
JAS. B. JOHNSTON.